United States Patent
Dong et al.

(10) Patent No.: US 11,703,430 B1
(45) Date of Patent: Jul. 18, 2023

(54) IN-SITU TENSILE DEVICE FOR X-RAY TESTS

(71) Applicant: Chinalco Materials Application Research Institute Co., Ltd., Beijing (CN)

(72) Inventors: Xueguang Dong, Beijing (CN); Junqiang Wang, Beijing (CN); Guojun Wang, Beijing (CN); Ronghui Fan, Beijing (CN); Mingdong Huang, Beijing (CN)

(73) Assignee: CHINALCO MATERIALS APPLICATION RESEARCH INST. CO., Beijing (CN)

( * ) Notice: Subject to any disclaimer, the term of this patent is extended or adjusted under 35 U.S.C. 154(b) by 0 days.

(21) Appl. No.: 18/091,391

(22) Filed: Dec. 30, 2022

(30) Foreign Application Priority Data

Feb. 7, 2022 (CN) .......................... 202210115477.9

(51) Int. Cl.
*G01N 3/08* (2006.01)

(52) U.S. Cl.
CPC ....... *G01N 3/08* (2013.01); *G01N 2203/0017* (2013.01); *G01N 2203/04* (2013.01); *G01N 2203/0641* (2013.01)

(58) Field of Classification Search
CPC ...... G01N 21/01; G01N 27/28; G01N 27/416; G01N 3/066; G01N 3/18; G01N 3/04; G01N 23/04; G01N 27/26; G01N 27/44791; G01N 23/20008; G01N 3/00; G01N 17/00; G01N 23/20025; G01N 23/20016;

(Continued)

(56) References Cited

U.S. PATENT DOCUMENTS

2011/0314926 A1 * 12/2011 Hanabusa ................ G01N 3/04
73/826

FOREIGN PATENT DOCUMENTS

CN 201765201 U * 3/2011
CN 103335898 A * 10/2013
(Continued)

OTHER PUBLICATIONS

CNIPA, Notification of a First Office Action for CN202210115477.9, dated Mar. 11, 2022.

(Continued)

*Primary Examiner* — Brandi N Hopkins
(74) *Attorney, Agent, or Firm* — Zhigang Ma

(57) ABSTRACT

An in-situ tensile device for X-ray tests is provided, including: a frame including a connecting structure, where the connecting structure is configured to fixedly connect to a testing bench of a testing device; a stretching mechanism, disposed on the frame; a clamping mechanism, including two clamping assemblies arranged opposite to each other in a length direction; where the two clamping assemblies are configured to clamp two ends of a testing piece, the testing piece is provided with a testing surface, and the testing surface is disposed on surfaces of the two clamping assemblies; the stretching mechanism is drivingly connected to the two clamping assemblies to enable the two clamping assemblies to move synchronously in one of a direction approaching each other and a direction far away from each other; and the two clamping assemblies are detachably connected to the stretching mechanism. The device can improve the accuracy of test results.

7 Claims, 5 Drawing Sheets

(58) Field of Classification Search
CPC .. G01N 17/004; G01N 23/2204; G01N 17/02; G01N 11/00; G01N 3/32; G01N 33/388; G01R 31/265; G01M 5/00
See application file for complete search history.

(56) References Cited

FOREIGN PATENT DOCUMENTS

| | | | |
|---|---|---|---|
| CN | 203502302 U | * | 3/2014 |
| CN | 113390720 A | | 9/2021 |

OTHER PUBLICATIONS

Chinalco Materials Application Research Institute Co., Ltd. (Applicant), Reply to Notification of a First Office Action for CN202210115477.9, w/ (allowed) replacement claims, dated Mar. 22, 2022.

CNIPA, Notification to grant patent right for invention in CN202210115477.9, dated Mar. 25, 2022.

* cited by examiner

IN-SITU TENSILE DEVICE FOR X-RAY TESTS

TECHNICAL FIELD

The disclosure relates to the technical field of material microstructure and mechanical property tests, in particular to an in-situ tensile device for X-ray tests.

BACKGROUND

In recent years, the concept of low-carbon development has become more and more popular, and lightweight engineering materials such as aluminum alloy, titanium alloy, etc. have attracted more and more attention. These materials have high specific strength, corrosion resistance and other characteristics and are widely used in aerospace, automotive lightweight, rail transit and other fields.

The microstructures of materials determine their macro properties. Therefore, X-ray is usually used to characterize the properties of the materials to evaluate their macro properties. In order to further study relationships between the properties and the structures of materials, it is usually necessary to perform in-situ tensile tests on the materials. When the in-situ tensile tests are performed on the materials, an in-situ tensile device is usually used to stretch the materials, and the changes of microstructures of materials in different tensile states are tested by X-ray to find an internal relationship between the microstructure and macro tensile deformation, thereby to solve the key mechanism problem of material use.

In order to improve a testing speed and a utilization rate of the tensile device, an offline in-situ tensile device is usually used, that is, a loading component and a tensile component disposed separately are used to perform tensile tests on a material. When the material is to be stretched, the material is placed in the tensile component, and the tensile component is driven by the loading component to stretch the material. After the material is stretched, the tensile component is separated from the loading component, and the tensile component and the material are placed together in a testing device for testing.

When the offline in-situ tensile device is used for stretching and testing, during the separation of the tensile component from the loading component and the transfer of the tensile component, the phenomenon that the stretched material rebounds due to vibration or touching the material may occur, which will affect the accuracy of test results.

SUMMARY

The disclosure provides an in-situ tensile device for X-ray tests to solve problems of complex operation and poor accuracy of test results in the prior art.

The disclosure provides the in-situ tensile device for X-ray tests. The in-situ tensile device includes: a frame, where the frame includes a connecting structure, and the connecting structure is configured to fixedly connect to a testing bench of a testing device; a stretching mechanism, disposed on the frame; a clamping mechanism, including two clamping assemblies arranged opposite to each other in a length direction; wherein the two clamping assemblies are configured to clamp two ends of a testing piece, the testing piece is provided with a testing surface, and the testing surface is disposed on surfaces of the two clamping assemblies; the stretching mechanism is drivingly connected to the two clamping assemblies to enable the two clamping assemblies to move synchronously in one of a direction approaching each other and a direction far away from each other; and the two clamping assemblies are detachably connected to the stretching mechanism.

In an embodiment, each of the two clamping assemblies includes: a supporting part, where the supporting part is drivingly connected to the stretching mechanism; a clamping part, disposed on the supporting part; where the clamping part is configured to fix the testing piece on the supporting part.

In an embodiment, the clamping part is sleeved on the supporting part, the supporting part is provided with a first top surface and a first bottom surface disposed opposite to each other, a part of the testing piece is located between the first top surface of the supporting part and the clamping part, each of the two clamping assemblies further includes first fasteners, and the first fasteners pass through the clamping part and are connected to the first bottom surface of the supporting part.

In an embodiment, the clamping part is sleeved on a first end of the supporting part close to the other clamping assembly, the stretching mechanism includes: driving assemblies; two connecting parts, where the two connecting parts are connected to the two clamping assemblies in a one-to-one correspondence manner, each of the two connecting parts is detachably connected to a second end of the corresponding supporting part opposite to the first end of the corresponding supporting part, and the driving assemblies are drivingly connected to the two connecting parts.

In an embodiment, each of the two connecting parts includes a first section, a second section and a third section which are sequentially connected; the first section and the third section are located on a same side of the second section, and the first section and the third section are configured to connect to the driving assemblies; the first section, the second section and the third section are arranged around a periphery of the supporting part, and the second section is disposed corresponding to the second end of the corresponding supporting part; and the stretching mechanism further includes second fasteners, and the second fasteners pass through the two connecting parts and are connected to the supporting parts of the two clamping assemblies.

In an embodiment, each of the two connecting parts includes a second top surface and a second bottom surface disposed opposite to each other, and a height of the second top surface is lower than or equal to a height of the first top surface of the corresponding supporting part.

In an embodiment, the in-situ tensile device for X-ray tests further includes: force measurement parts, disposed on one of the supporting parts of the two clamping assemblies; where the force measurement parts are located at an end of the one supporting part connected to the corresponding connecting part, and the force measurement parts are configured to detect tension data.

In an embodiment, the in-situ tensile device for X-ray tests further includes a displacement sensing assembly, the displacement sensing assembly is configured to measure a relative displacement of the two clamping assemblies, and the displacement sensing assembly is electrically connected to the stretching mechanism.

In an embodiment, the frame is provided with an avoidance part, the avoidance part is disposed corresponding to the testing surface, and the two clamping assemblies are disposed at two sides of the avoidance part; the displacement sensing assembly includes: a displacement sensor; two fixing parts, where the two fixing parts and the two clamping assemblies are arranged in a one-to-one correspondence manner, the two fixing parts are movably disposed in the avoidance part, an end of each of the two fixing parts is connected to the corresponding clamping assembly, and another end of each of the fixing parts is connected to the displacement sensor.

In an embodiment, the frame includes a frame body, the frame body is provided with the avoidance part, the two clamping assemblies are disposed above the frame body, the displacement sensor is disposed blow the frame body, and the displacement sensor is eccentrically disposed with the avoidance part.

In an embodiment, the stretching mechanism includes the driving assemblies with a number of two, the two driving assemblies and the two clamping assemblies are arranged in a one-to-one correspondence manner, and the two driving assemblies are drivingly connected to the two clamping assemblies.

In an embodiment, each of the two driving assemblies includes: a driving part, disposed on the frame; a stretching lead screw, where the driving part is drivingly connected to the stretching lead screw, the stretching lead screw is provided with a first threaded section and a second threaded section which are disposed at intervals in an extending direction of the stretching lead screw, thread directions of the first threaded section and the second threaded section are opposite, and the two connecting parts are threaded with the first threaded section and the second threaded section respectively.

By applying the technical solution of the disclosure, a frame is fixed on a testing bench of a testing device by a connecting structure, and a stretching mechanism and a clamping mechanism are disposed on the frame, the clamping mechanism can clamp a testing piece, and the testing piece can be stretched by driving of the stretching mechanism. By the above setting, an in-situ tensile device for X-ray tests can be fixed on the testing bench directly. After the testing piece is stretched by the stretching mechanism, the testing piece can be directly tested by the testing device. To stretch for many times, it is only necessary to drive the stretching mechanism to stretch the testing piece. In this way, the testing piece can be stretched and detected in real time without adjusting a position of the testing piece or the in-situ tensile device manually. Therefore, an original state of the testing piece can be ensured after the stretching, which avoids changes of the force on the testing piece caused by manually moving the in-situ tensile device, and thus improving the accuracy of the test results.

BRIEF DESCRIPTION OF DRAWINGS

The attached drawings of the description, which form a part of the disclosure, are used to provide a further understanding of the disclosure. Exemplary embodiments and their explanations of the disclosure are used to explain the disclosure, and do not constitute an improper limitation of the disclosure.

Figure 1:
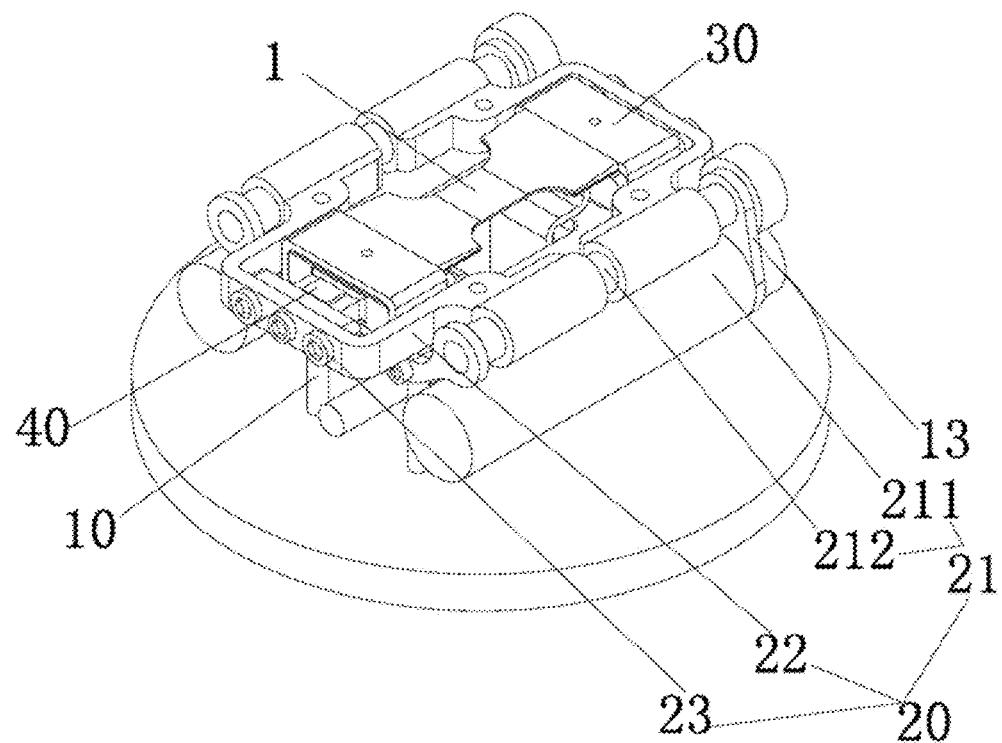
FIG. 1 shows a structural diagram of an in-situ tensile device for X-ray tests provided by an embodiment of the disclosure.

Description of Reference Numerals:

1-testing piece; 10-frame; 11-frame body; 111-avoidance hole; 12-connecting rod; 13-connecting sheet; 20-stretching mechanism; 21-driving assembly; 211-driving part; 212-stretching lead screw; 22-connecting part; 221-first section; 222-second section; 223-third section; 23-second fastener; 30-clamping assembly; 31-supporting part; 312-second threaded hole; 32-clamping part; 321-first connecting hole; 322-second connecting hole; 323-observation hole; 33-first fastener; 40-force measurement part; 50-displacement sensing assembly; 51-displacement sensor; 52-fixing part.

DETAILED DESCRIPTION OF EMBODIMENTS

In combination with drawings in the embodiments of the disclosure, the technical solutions in the embodiments of the disclosure will be described clearly and completely. Apparently, the described embodiments are only some of the embodiments of the disclosure, not all of them. The following description of at least one exemplary embodiment is only illustrative in fact and should not be considered as any limitation on the disclosure and its application or use. Based on the embodiments of the disclosure, all other embodiments obtained by those skilled in the art without creative work should belong to the protection scope of the disclosure.

As shown in FIG. 1 to FIG. 7, an in-situ tensile device for X-ray tests is provided in the embodiment 1 of the disclosure. The in-situ tensile device includes a frame 10, a stretching mechanism 20, and a clamping mechanism. Specifically, the frame 10 includes a connecting structure, and the connecting structure is configured to fixedly connect to a testing bench of a testing device. The stretching mechanism 20 is disposed on the frame 10. The clamping mechanism includes two clamping assemblies 30 arranged opposite to each other in a length direction, and the two clamping assemblies 30 are configured to clamp two ends of a testing piece 1. The testing piece 1 is provided with a testing surface, and the testing surface is disposed on surfaces of the two clamping assemblies 30. By setting the testing surface on the surfaces of the two clamping assemblies 30, interferences of other structures of the in-situ tensile device to X-ray can be avoided, which will not affect a normal test. The stretching mechanism 20 is drivingly connected to the two clamping assemblies 30 to enable the two clamping assemblies 30 to move synchronously in one of a direction approaching each other and a direction far away from each other; and the two clamping assemblies 30 are detachably connected to the stretching mechanism 20. Specifically, X-ray diffraction and transmission tests can be carried out with the in-situ tensile device.

By applying the technical solution of the disclosure, the frame 10 is fixed on the testing bench of the testing device by the connecting structure, the stretching mechanism 20 and the clamping mechanism are disposed on the frame 10, the clamping mechanism can clamp the testing piece 1, and the stretching mechanism 20 can drive the testing piece 1 to be stretched. By the above setting, the in-situ tensile device for X-ray tests can be fixed on the testing bench directly.

After the testing piece 1 is stretched by the stretching mechanism 20, the testing piece 1 can be directly tested by the testing device. To stretch for many times, it is only necessary to drive the stretching mechanism 20 to stretch the testing piece 1. In this way, the testing piece 1 can be stretched and detected in real time without adjusting a position of the testing piece 1 or the in-situ tensile device manually. Therefore, an original state of the testing piece 1 can be ensured after the stretching, which avoids changes of the force on the testing piece 1 caused by manually moving the in-situ tensile device, and thus improving the accuracy of the test results.

Figure 2:
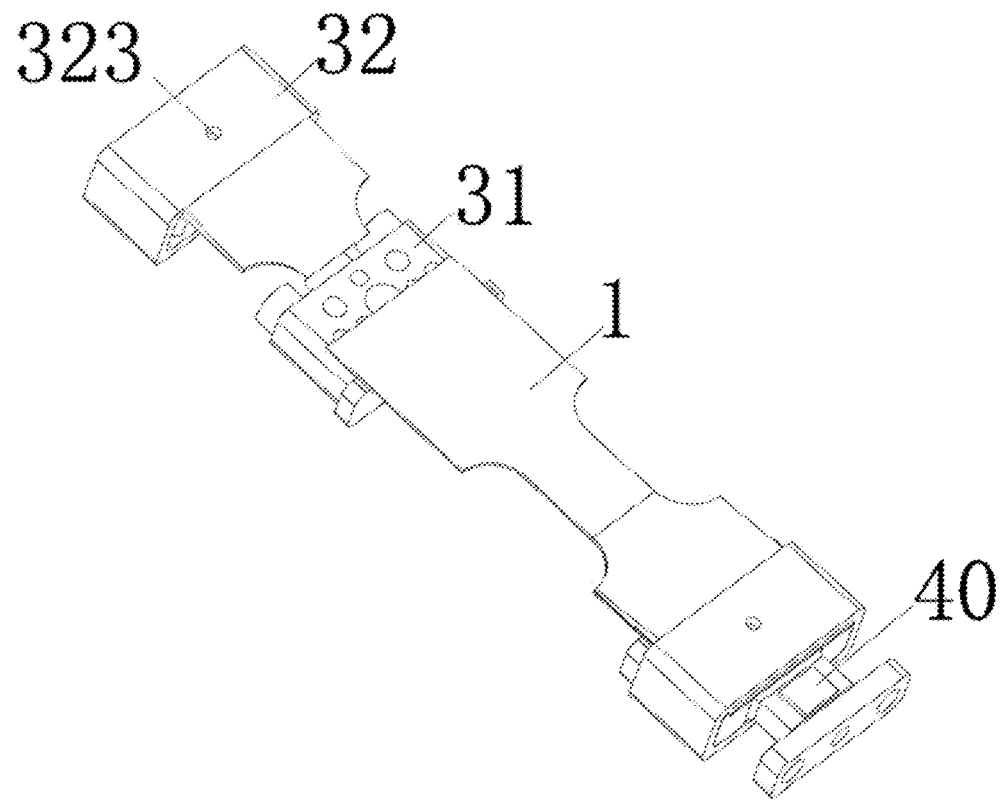
FIG. 2 shows an exploded view of a stretching mechanism provided by the embodiment of the disclosure.
Figure 3:
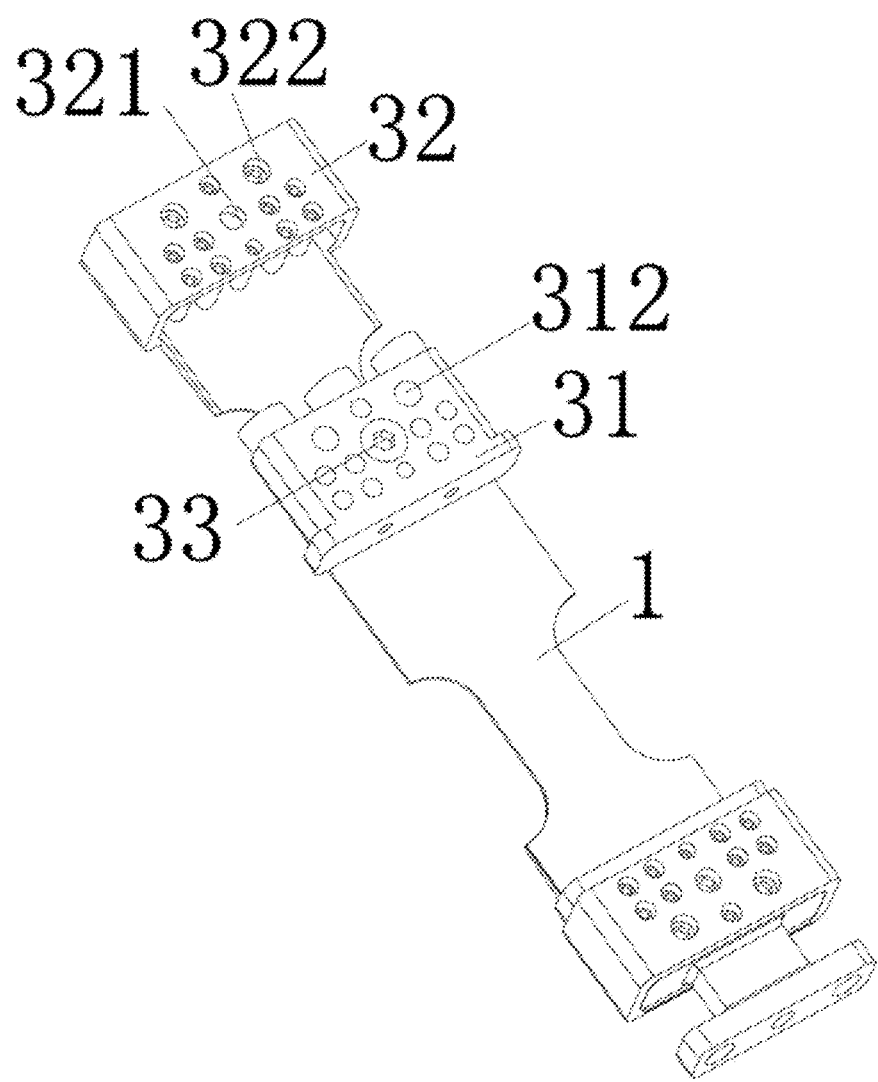
FIG. 3 shows a structural diagram of a bottom of the stretching mechanism provided by the embodiment of the disclosure.

As shown in FIG. 1 to FIG. 3, each of the two clamping assemblies 30 includes a supporting part 31 and a clamping part 32. Specifically, the supporting part 31 is drivingly connected to the stretching mechanism 20, the clamping part 32 is disposed on the supporting part 31, and the clamping part 32 is configured to fix the testing piece 1 on the supporting part 31. When a tensile test is performed on the testing piece 1, ends of the testing piece 1 are fixed by the supporting parts 31 and the clamping parts 32, the stretching mechanism 20 drives the supporting parts 31 to move, the movements of the supporting parts 31 drive the clamping parts 32 to move, thereby to complete the tensile test.

Specifically, the clamping part 32 is sleeved on the supporting part 31, the supporting part 31 is provided with a first top surface and a first bottom surface disposed opposite to each other, a part of the testing piece 1 is located between the first top surface of the supporting part 31 and the clamping part 32, each of the two clamping assemblies 30 further includes first fasteners 33, and the first fasteners 33 pass through the clamping part 32 and are connected to the first bottom surface of the supporting part 31. Specifically, the supporting part 31 is a blocky structure, the clamping part 32 is provided with the through hole and the through hole passes through the clamping part 32, there is a gap between the supporting part 31 and a hole wall of the through hole, the clamping part 32 is sleeved on the supporting part 31 through the through hole. When clamping the testing piece 1 is needed, an end of the testing piece 1 firstly passes through a gap between one group of the supporting part 31 and the clamping part 32, then the end of the testing piece 1 extends into a gap between the other group of the supporting part 31 and the clamping part 32 until a center of the testing piece 1 is located at a middle of the two clamping assemblies 30. Finally, the testing piece 1 is fixed by the first fasteners 33. The above setting can improve the convenience of clamping the testing piece 1.

Specifically, a bottom of each of the clamping parts 32 is provided with a first connecting hole 321, and the first connecting hole 321 is communicated with the through hole. A bottom of the supporting part 31 is provided with a first threaded hole, the first threaded hole and the first connecting hole 321 are disposed correspondingly, the first fastener 33 is threaded with the first threaded hole, and a diameter of an outer edge of an end of the first fastener 33 is larger than a diameter of the first connecting hole 321. After each of the clamping parts 32 is sleeved on the corresponding supporting part 31, the supporting parts 31 and the clamping parts 32 are matched to clamp the testing piece 1 by rotating the first fasteners 33. The bottom of each of the clamping parts 32 is further provided with second connecting holes 322, the second connecting holes 322 are communicated with the through hole, the second connecting holes 322 are annularly spaced along an outer periphery of the first connecting hole 321. Each of the supporting parts 31 is provided with second threaded holes 312, and the second threaded holes 312 are arranged in one-to-one correspondence with the second connecting holes 322. Each of the two clamping assemblies 30 further includes third fasteners. The third fasteners are arranged in one-to-one correspondence with the second connecting holes 322, and the third fasteners pass through the second connecting holes 322 and are in threaded connection with the second threaded holes 312. In specific operation, after each of the ends of the testing piece 1 is located between the supporting part 31 and the clamping part 32, the first fasteners 33 are tightened, then the supporting parts 31 move upward under actions of the first fasteners 33, and ends of the first fasteners 33 act reversely on the clamping parts 32, so that the clamping parts 32 move downward, and then each of the ends of the testing piece 1 can be clamped between the supporting part 31 and the clamping part 32. Then, the third fasteners are tightened, so that the testing piece 1 can be firmly fixed by the supporting parts 31 and the clamping parts 32, which improves the stability of clamping the testing piece 1, ensures the smoothness of the test, and improves the accuracy of the test results. In addition, by the above structures, the gap between the hole wall of the through hole of the clamping part 32 and the supporting part 31 can be adjusted in up and down directions, so that the two clamping assemblies 30 can clamp the testing pieces 1 with different thicknesses, further improving the adaptability of the in-situ tensile device.

In an illustrated embodiment, a top of each of the clamping parts 32 is provided with an observation hole 323, and the observation hole 323 is connected with the through hole. The observation hole 323 can be set to observe whether the testing piece 1 is offset after the stretching, so as to ensure the accuracy of the test results.

Specifically, each of the clamping parts 32 includes a body and a shielding sheet which are connected in turn. The body is provided with the through hole. The shielding sheet is located at an end of the body close to the other clamping assembly 30, and the thickness of the shielding sheet gradually becomes thinner from the body to the shielding sheet. The shielding sheet is configured to abut against a top surface of the testing piece 1. The setting of shielding sheet can shield parts of testing piece 1 that are not irradiated by X-ray, and further improve accuracy of irradiation and positioning of the testing piece 1. The thickness of the shielding sheet is set to be gradually thinned, which can minimize the shielding of the shielding sheet to the X-ray in a pre-irradiation area of the testing piece 1, so as to ensure the normal test. Specifically, in this embodiment, the body and the shield sheet form an integrated structure.

Figure 4:
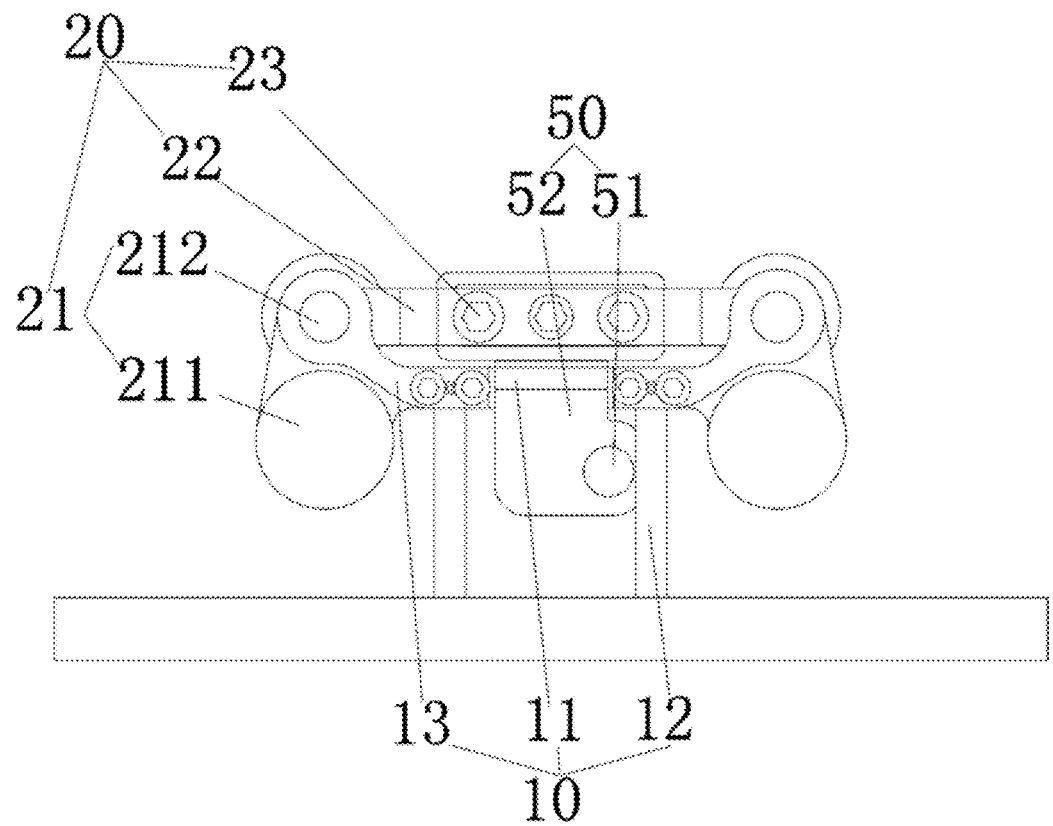
FIG. 4 shows a front view of the in-situ tensile device for X-ray tests provided by the embodiment of the disclosure.
Figure 5:
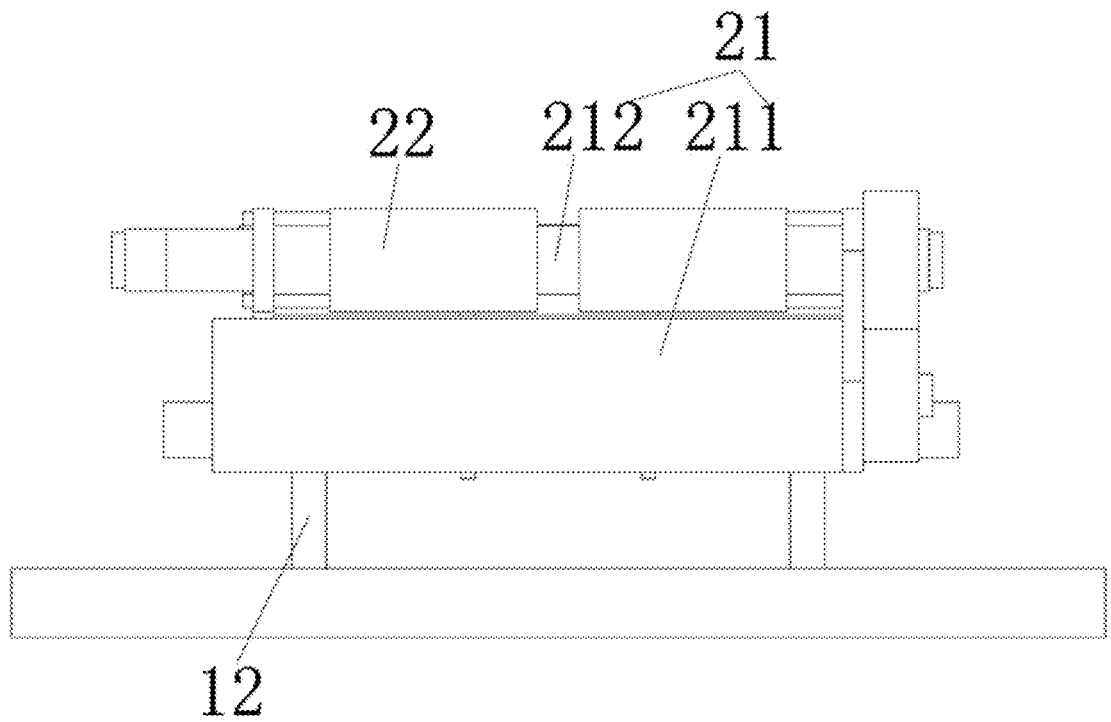
FIG. 5 shows a side view of the in-situ tensile device for X-ray tests provided by the embodiment of the disclosure.
Figure 6:
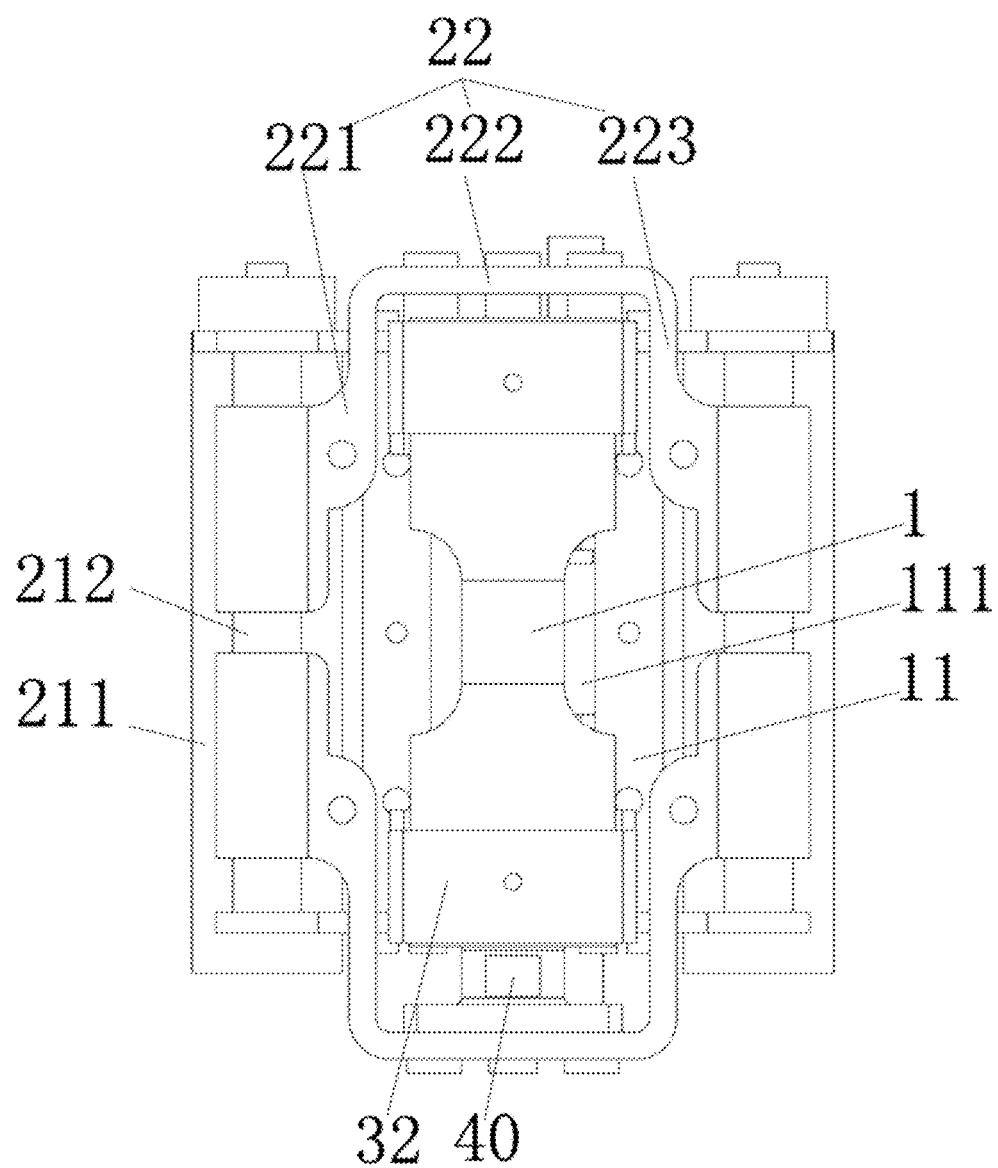
FIG. 6 shows a top view of the in-situ tensile device for X-ray tests provided by the embodiment of the disclosure.
Figure 7:
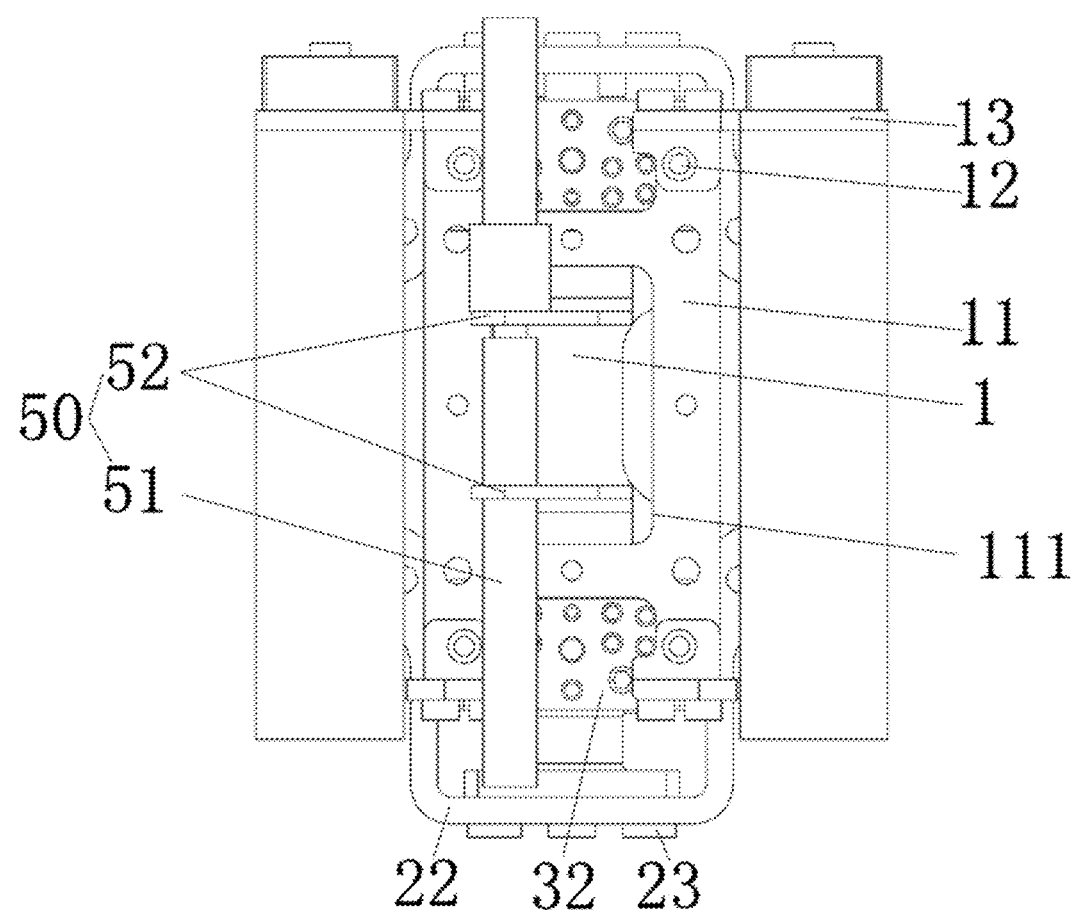
FIG. 7 shows a bottom view of the in-situ tensile device for X-ray tests provided by the embodiment of the disclosure.

As shown in FIG. 1, FIG. 4, and FIG. 7, each of the clamping parts 32 is sleeved on a first end of the corresponding supporting part 31 close to the other clamping assembly 30, the stretching mechanism includes driving assemblies 21 and two connecting parts 22. The two connecting parts 22 are connected to the two clamping assemblies 30 in a one-to-one correspondence manner, each of the two connecting parts 22 is detachably connected to a second end of the corresponding supporting part 31 opposite to the first end of the corresponding supporting part 31, and the driving assemblies 21 are drivingly connected to the two connecting parts 22. When it is necessary to replace the clamping assemblies 30 with different specifications and dimensions, it is only necessary to separate the supporting parts 31 from the connecting parts 22 and replace the clamping assemblies 30 with different specifications. The above setting can make the in-situ tensile device be suitable for the testing pieces 1 with different sizes and experiments under different tensile conditions, and further improve the adaptability of the in-situ tensile device.

Specifically, each of the two connecting parts 22 includes a first section 221, a second section 222 and a third section 223 which are sequentially connected; the first section 221 and the third section 223 are located on a same side of the second section 222, and the first section 221 and the third section 223 are configured to connect to the driving assemblies 21; the first section 221, the second section 222 and the third section 223 are arranged around a periphery of the supporting part 31, and the second section 222 is disposed corresponding to the second end of the corresponding supporting part 31; and the stretching mechanism 20 further includes second fasteners 23, and the second fasteners 23 pass through the two connecting parts 22 and are connected to the supporting parts 31. Specifically, the first section 221 and the third section 223 are both vertically arranged with the second section 222. With such arrangements, the two clamping assemblies 30 are positioned between the two connecting parts 22, which can avoid interferences of the connecting parts 22 to the testing piece 1 during the tensile test, and ensure the smoothness of the tensile test. Moreover, the above settings can ensure the structural compactness of the in-situ tensile device.

In an embodiment, each of the two connecting parts 22 includes a second top surface and a second bottom surface disposed opposite to each other, and a height of the second top surface is lower than or equal to a height of the first top surface of the corresponding supporting part 31. This setting can ensure the smoothness of clamping the testing piece 1. In the embodiment, the height of the second top surface is equal to the height of the first top surface. The above setting enable each of the ends of the testing piece 1 to smoothly transition between the second top surface of the connecting part 22 and the first top surface of the supporting part 31 when placing the testing piece 1, thereby to avoid or reduce bending of the testing piece 1 and ensuring the accuracy of the test results.

In an embodiment, the in-situ tensile device for X-ray tests further includes a force measurement part 40. The force measurement part 40 is disposed on the supporting part 31. For more detail, the force measurement part 40 is located at an end of the supporting part 31 connected to the connecting part 22, and the force measurement part 40 is configured to detect tension data. Furthermore, the force measurement part 40 is electrically connected to the driving assemblies 21. When a constant tensile test is performed on the testing piece 1, the stretching mechanism 20 drives the two clamping assemblies 30 to move synchronously in the direction far away from each other until deformation of the support part 31 reaches a preset value. The force measuring part 40 detects information caused by the deformation and transmits the information to the stretching mechanism 20, and the stretching mechanism 20 stops stretching. Specifically, the force measuring part 40 is arranged on one of the supporting parts 31. The supporting part 31 which is provided with the force measuring part 40 includes a fitting section, a transition section and a connecting section which are sequentially connected along a connecting direction of the two clamping assemblies 30. The fitting section is disposed in the through hole of the clamping part 32 and configured to pass through the through hole of the clamping part 32, the connecting section is abutted with a side wall of the connecting part 22 close to the supporting part 31 and connected to the second fasteners 23, and widths of the connecting section and the fitting section are both greater than a width of the transition section. The numbers of the force measuring piece 40 are four, and the four force measuring pieces 40 are arranged on a circumference of the transition section in a circular manner. This setting can improve the accuracy of the deformation measurement of the transition section by the force measuring parts 40, and further improve the accuracy of the test results. This setting can also realize the automation of the stretching process of testing piece 1, and further improve the accuracy of the test results.

As shown in FIG. 4 and FIG. 7, the in-situ tensile device further includes a displacement sensing assembly 50, the displacement sensing assembly 50 is configured to measure a relative displacement of the two clamping assemblies 30, and the displacement sensing assembly 50 is electrically connected to the stretching mechanism 20. When the testing piece 1 is stretched with a quantitative displacement, the stretching mechanism 20 drives the two clamping assemblies 30 to move far away from each other synchronously until the two clamping assemblies 30 move to a preset displacement, and the stretching mechanism 20 stops driving. The setting of displacement sensing assembly 50 can enable the in-situ tensile device to realize the stretching operation of the quantitative displacement, which improves accuracy of deformation of testing piece 1 during the stretching process and ensures the accuracy of the test results.

In an embodiment, the frame 10 is provided with an avoidance part, the avoidance part is disposed corresponding to the testing surface, and the two clamping assemblies 30 are disposed at two sides of the avoidance part. The displacement sensing assembly 50 includes a displacement sensor 51 and two fixing parts 52. Specifically, the two fixing parts 52 and the two clamping assemblies 30 are arranged in a one-to-one correspondence manner, the two fixing parts 52 are movably disposed in the avoidance part, an end of each of the two fixing parts 52 is connected to the corresponding clamping assembly 30, another end of each of the fixing parts 52 is connected and matched with the displacement sensor 51, and the displacement sensor 51 is electrically connected to the two drive assemblies 21. Specifically, in this embodiment, the fixing parts 52 can be movably disposed in an avoidance hole 111 (also referred to the avoidance part), and the fixing parts 52 pass through the avoidance hole 111. Each of the fixing parts 52 is disposed at an end of the corresponding supporting part 31 close to the other clamping assembly 30, and a top surface of each of the fixing parts 52 is lower than a bottom surface of each of the supporting parts 31, so as to avoid contact between the testing piece 1 and the fixing parts 52. During the quantitative displacement test, the two clamping assemblies 30 move and drive the fixing parts 52 to move in the avoidance hole 111. The displacement sensor 51 detects a displacement of the fixing parts 52 and transmits the displacement information to the driving assemblies 21. The displacement sensor 51 and the fixing parts 52 are arranged with simple structure and convenient assembly.

In an embodiment, the frame 10 includes a frame body 11, the frame body 11 is provided with the avoidance part, the two clamping assemblies 30 are disposed above the frame body 11, the displacement sensor 51 is disposed blow the frame body 11, and the displacement sensor 51 is eccentrically disposed with the avoidance part. Specifically, the avoidance part is the avoidance hole 111. Furthermore, the frame 10 also includes connecting rods 12, the connecting rods 12 with a number of four are disposed vertically, the four connecting rods 12 are all arranged at a bottom of the frame body 11 and a periphery of the avoidance hole 111. The four connecting rods 12 form the connecting structure.

As the displacement sensor 51 and the avoidance hole 111 are eccentrically set, when the in-situ tensile device is used to perform a transmission test on the testing piece 1, the avoidance hole 111 can enable the X-ray of the testing device to pass through and complete the transmission test, which improves the adaptability of the in-situ tensile device. Moreover, the above settings can ensure the structural compactness of the in-situ stretching device, avoid interferences of the displacement sensor 51 and the fixing parts 52 on the testing piece 1 during the stretching process, and ensure the smoothness of the stretching process.

In an embodiment, the stretching mechanism 20 includes the two driving assemblies 21, the two driving assemblies 21 and the two clamping assemblies 30 are arranged in a one-to-one correspondence manner, and the two driving assemblies 21 are drivingly connected to the two clamping assemblies 30. Specifically, the two driving assemblies 21 are respectively arranged on two sides of the frame body 11, and the two driving assemblies 21 are matched with the two connecting parts 22 to form a closed annular structure. The two clamping assemblies 30 are located in the closed annular structure. The setting of the two driving assemblies 21 can ensure the smoothness of the movement of the two clamping assemblies 30, thus ensuring uniformity of forces on the testing piece 1 and the accuracy of the test results. Moreover, the above settings can ensure the structural compactness of the in-situ tensile device.

Specifically, each of the two driving assemblies includes a driving part 211 and a stretching lead screw 212. The driving part 211 is disposed on the frame 10, and the driving part 211 is drivingly connected to the stretching lead screw 212. The stretching lead screw 212 is provided with a first threaded section and a second threaded section which are disposed at intervals in an extending direction of the stretching lead screw 212, thread directions of the first threaded section and the second threaded section are opposite, and the two connecting parts 22 are threaded with the first threaded section and the second threaded section respectively. Specifically, the frame 10 further includes connecting sheets 13 which are arranged in one-to-one correspondence with the two driving assemblies 21. Each of the driving parts 211 is a motor, the motor is disposed on the corresponding connecting sheet 13, the stretching lead screw 212 is located above the motor, and the stretching lead screw 212 is rotatably disposed on the corresponding connecting sheet 13, and an output shaft of the motor is disposed in parallel with the corresponding stretching lead screw 212. When the tensile test is performed on the testing piece 1, the driving parts 211 are turned on, the driving parts 211 drive the stretching lead screws 212 to rotate, then the stretching lead screws 212 are rotated to drive the connecting parts 22, thereby to drive the two clamping assemblies 30 to move. The stretching lead screw 212 has a self-locking function, which can ensure the stability of the connecting parts 22 after the driving parts 211 stops working, prevent the clamping assembly 30 from moving with the connecting part 22, ensure the stability of clamping the testing piece 1, and further improve the accuracy of the test results.

In the embodiment, the two driving assemblies 21 include two driving parts 211 and two stretching lead screws 212. The two driving parts 211 and the two stretching lead screws 212 are arranged in one-to-one correspondence. One of the driving parts 211 and one of the stretching lead screws 212 are located on a side of the frame 10, and the other driving part 211 and the other stretching lead screw 212 are located on the other side of the frame 10. The first section 221 of one of the connecting parts 22 is threaded with a corresponding stretching lead screw 212, The third section 223 of one of the connecting parts 22 is threaded with the other stretching lead screw 212, and the connecting part 22 is connected to the two stretching lead screws 212 with the same threads. With the above structures, the two driving parts 211 are used to drive the two stretching lead screws 212 to rotate, so that the two connecting parts 22 can move in the direction approaching each other or the direction far away from each other, thereby stretching the testing piece 1.

It should be noted that the terms used here are only intended to describe specific embodiments, not to limit the exemplary embodiments of the disclosure. In the above description, unless the context clearly indicates otherwise, the singular form is also intended to include the plural form. In addition, it should be understood that when the terms "contain" and/or "include" are used in this specification, they indicate the existence of features, steps, operations, devices, components and/or combinations thereof.

Unless otherwise specified, the relative arrangement, numerical expressions, and numerical values of the components and steps described in these embodiments do not limit the scope of the disclosure. At the same time, it should be understood that, for the convenience of description, dimensions of parts shown in the drawings are not drawn according to actual scales and relationships. The technologies, methods and equipment known to those skilled in the art may not be discussed in detail, but in appropriate cases, the technologies, methods and equipment shall be considered as part of the authorization specification. In all the embodiments shown and discussed herein, any specific values should be interpreted as merely illustrative and not as a limitation. Therefore, other examples of the exemplary embodiments may have different values. It should be noted that similar labels and letters indicate similar items in the following drawings. Therefore, once an item is defined in a drawing, it does not need to be further discussed in the subsequent drawings.

In the description of the disclosure, it should be understood that the orientation or position relationships indicated by the location words such as "front, back, up, down, left, right", "horizontal, vertical" and "top, bottom" are usually based on the orientation or position relationship shown in the attached drawings, only for the convenience of describing the disclosure and simplifying the description. Unless otherwise stated, these location words do not indicate or imply that the device or element referred must have a specific location or be constructed and operated in a specific location, so they cannot be understood as a limitation on the scope of protection of the disclosure. The location words "inside and outside" refer to the inside and outside of the contour relative to each component itself.

For the convenience of description, space relative terms can be used here, such as "above", "on", "on an upper surface of", "top", etc., to describe the spatial position relationship between one device or feature shown in the drawing and another device or feature. It should be understood that the space relative terms are intended to include different orientations in use or operation other than those described in the drawing for the device. For example, if the devices in the drawings are inverted, the devices described as "above other devices or structures" or "on other devices or structures" will be later considered as "below other devices or structures" or "under other devices or structures". Thus, the exemplary term "above" can include two orientations: "above" and "below". The device can also be positioned in other different ways (such as the device is rotated by 90 degrees or in other orientations), and the relative description of the space used here is explained accordingly.

In addition, it should be noted that the use of "first", "second" and other words to define parts is only to facilitate the differentiation of corresponding parts. Without further statement, the above words have no special meaning, and therefore cannot be understood as a limitation to the protection scope of the disclosure.

The above embodiments are only some of the embodiments of the disclosure, and are not intended to limit the disclosure. For those skilled in the art, the disclosure can have various changes and variations. Any modification, equivalent replacement, improvement, and others made within the spirit and principle of the disclosure shall be included in the protection scope of the disclosure.

What is claimed is:

1. An in-situ tensile device for X-ray tests, comprising:
    a frame (10), wherein the frame (10) comprises a connecting structure, and the connecting structure is configured to fixedly connect to a testing bench of a testing device;
    a stretching mechanism (20), disposed on the frame (10);
    a clamping mechanism, comprising two clamping assemblies (30) arranged opposite to each other in a length direction; wherein the two clamping assemblies (30) are configured to clamp two ends of a testing piece (1), the testing piece (1) is provided with a testing surface, and the testing surface is disposed on surfaces of the two clamping assemblies (30); the stretching mechanism (20) is drivingly connected to the two clamping assemblies (30) to enable the two clamping assemblies (30) to move synchronously in one of a direction approaching each other and a direction far away from each other; and the two clamping assemblies (30) are detachably connected to the stretching mechanism (20);
    wherein each of the two clamping assemblies (30) comprises:
        a supporting part (31), wherein the supporting part (31) is drivingly connected to the stretching mechanism (20);
        a clamping part (32), disposed on the supporting part (31); wherein the clamping part (32) is configured to fix the testing piece (1) on the supporting part (31);
        wherein the clamping part (32) is sleeved on the supporting part (31), the supporting part (31) is provided with a first top surface and a first bottom surface disposed opposite to each other, a part of the testing piece (1) is located between the first top surface of the supporting part (31) and the clamping part (32), each of the two clamping assemblies (30) further comprises first fasteners (33), and the first fasteners (33) pass through the clamping part (32) and are connected to the first bottom surface of the supporting part (31);
    wherein the clamping part (32) is sleeved on a first end of the supporting part (31) close to the other clamping assembly (30);
    wherein the stretching mechanism (20) comprises:
        driving assemblies (21);
        two connecting parts (22), wherein the two connecting parts (22) are connected to the two clamping assemblies (30) in a one-to-one correspondence manner, each of the two connecting parts (22) is detachably connected to a second end of the corresponding supporting part (31) opposite to the first end of the corresponding supporting part (31), and the driving assemblies (21) are drivingly connected to the two connecting parts (22);
    wherein each of the two connecting parts (22) comprises a first section (221), a second section (222) and a third section (223) which are sequentially connected; the first section (221) and the third section (223) are located on a same side of the second section (222), and the first section (221) and the third section (223) are configured to connect to the driving assemblies (21); the first section (221), the second section (222) and the third section (223) are arranged around a periphery of the supporting part (31), and the second section (222) is disposed corresponding to the second end of the corresponding supporting part (31); and the stretching mechanism (20) further comprises second fasteners (23), and the second fasteners (23) pass through the two connecting parts (22) and are connected to the supporting parts (31) of the two clamping assemblies (30); and
    wherein each of the two connecting parts (22) comprises a second top surface and a second bottom surface disposed opposite to each other, and a height of the second top surface is lower than or equal to a height of the first top surface of the corresponding supporting part (31).

2. The in-situ tensile device for X-ray tests according to claim 1, wherein the in-situ tensile device for X-ray tests further comprises:
    force measurement parts (40), disposed on one of the supporting parts (31) of the two clamping assemblies (30); wherein the force measurement parts (40) are located at an end of the one supporting part (31) connected to the corresponding connecting part (22), and the force measurement parts (40) are configured to detect tension data.

3. The in-situ tensile device for X-ray tests according to claim 1, wherein the in-situ tensile device for X-ray tests further comprises a displacement sensing assembly (50), the displacement sensing assembly (50) is configured to measure a relative displacement of the two clamping assemblies (30), and the displacement sensing assembly (50) is electrically connected to the stretching mechanism (20).

4. The in-situ tensile device for X-ray tests according to claim 3, wherein the frame (10) is provided with an avoidance part, the avoidance part is disposed corresponding to the testing surface, and the two clamping assemblies (30) are disposed at two sides of the avoidance part; and
    wherein the displacement sensing assembly (50) comprises:
        a displacement sensor (51);
        two fixing parts (52), wherein the two fixing parts (52) and the two clamping assemblies (30) are arranged in a one-to-one correspondence manner, the two fixing parts (52) are movably disposed in the avoidance part, an end of each of the two fixing parts (52) is connected to the corresponding clamping assembly (30), and another end of each of the fixing parts (52) is connected to the displacement sensor (51).

5. The in-situ tensile device for X-ray tests according to claim 4, wherein the frame (10) comprises a frame body (11), the frame body (11) is provided with the avoidance part, the two clamping assemblies (30) are disposed above the frame body (11), the displacement sensor (51) is disposed blow the frame body (11), and the displacement sensor (51) is eccentrically disposed with the avoidance part.

6. The in-situ tensile device for X-ray tests according to claim 1, wherein the stretching mechanism (20) comprises two numbers of the driving assemblies (21), the two driving assemblies (21) and the two clamping assemblies (30) are arranged in a one-to-one correspondence manner, and the two driving assemblies (21) are drivingly connected to the two clamping assemblies (30).

7. The in-situ tensile device for X-ray tests according to claim 6, wherein each of the two driving assemblies comprises:

a driving part (211), disposed on the frame (10);

a stretching lead screw (212), wherein the driving part (211) is drivingly connected to the stretching lead screw (212), the stretching lead screw (212) is provided with a first threaded section and a second threaded section which are disposed at intervals in an extending direction of the stretching lead screw (212), thread directions of the first threaded section and the second threaded section are opposite, and the two connecting parts (22) are threaded with the first threaded section and the second threaded section respectively.

* * * * *